INVENTOR.
GAYLORD W. BROWN
LARRY BRUSHABER
BY MELVIN L. BROWN

INVENTOR.
GAYLORD W. BROWN
LARRY BRUSHABER
MELVIN L. BROWN

United States Patent Office 3,701,708
Patented Oct. 31, 1972

3,701,708
APPARATUS FOR FRICTION WELDING SYNTHETIC PLASTIC CONTAINER PARTS AND THE LIKE
Gaylord W. Brown and Larry Brushaber, Beaverton, and Melvin L. Brown, Gladwin, Mich., assignors to Koehring Company, Milwaukee, Wis.
Filed Jan. 2, 1969, Ser. No. 788,536
Int. Cl. B32b 31/20, 31/04
U.S. Cl. 156—582                 11 Claims

ABSTRACT OF THE DISCLOSURE

Apparatus and methods for friction welding thermoplastic synthetic plastic container parts of non-cylindrical configuration wherein a holder for one part is moved toward another holder for a second part to engage the respective surafces of the parts to be friction welded, and wherein an eccentric shaft extending substantially perpendicularly to the surfaces to be welded together oscillates one of the holders and parts relative to the other in the plane of engagement of the surfaces for a time sufficient to achieve a friction weld of the surfaces, sensing means being provided in the path of movement of the holder for the non-oscillated part which senses when the weld is achieved and is connected to disable the drive for oscillating the one holder, for withdrawing one holder relative to the other to permit unloading and reloading, and for releasing the vacuum employed by the holders to hold the parts.

---

One of the prime objects of the present invention is to design a practical and efficient machine and method for friction welding parts which cannot be friction welded by conventional spin welding equipment.

A further object of the invention is to design a highly reliable machine and method of the character described employing a sensing device which is actuated immediately when the weld is achieved and releases all forces tending to restrain the parts from moving together as a units as well as the oscillating drive for moving one of the parts.

Other objects and advantages of the invention will be pointed out specifically or will become apparent from the following description when it is considered in conjunction with the appended claims and the accompanying drawings, in which:

FIG. 4 is a perspective elevational view showing the parts friction welded together to form a container or the like.

Figure 4:
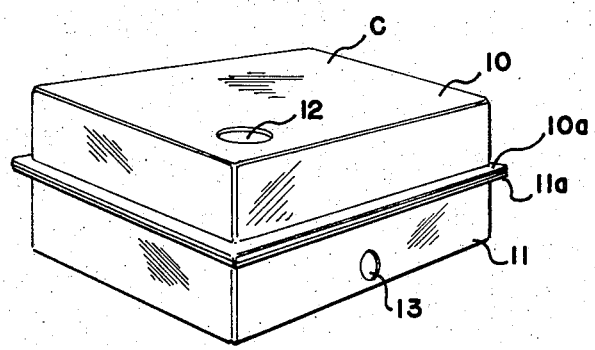

Referring now more particularly to the accompanying drawings in which a preferred embodiment of the invention only has been shown, and in the first instance particularly to FIG. 4, the parts to be friction welded may comprise the separate, oblong, mating halves 10 and 11 of a container C such as a vehicle gasoline tank. Each of the members 10 and 11, which are separately formed of a synethetic, thermoplostic plastic material in conventional differential pressure thermoforming equipment, is provided with a flange, shown at 10a and 11a, respectively, and part 10 may have an opening 12, as shown, through which gasoline may be supplied. The part 11 may then be provided with an opening 13 to which a tube or the like may be connected for passing the gasoline to the vehicle carburetor. Shallow draft parts such as shown at 10 and 11 may be separately vacuum formed very economically in high speed thermoforming machines such as shown in the Brown and Rise United States Pat. No. 3,346,923 in conventional plastic material such as polystyrene, polyethylene, and polypropylene, for example.

While cylindrical parts may be readily friction welded in a machine of the character disclosed in Brown and the Rise United States Pat. No. 3,297,504, such friction welding machines are obviously not suited to joining parts of square or oblong configuration, such as the parts illustrated in FIG. 4. The machine disclosed in FIGS. 1–3 comprises a frame generally designated F, and including a base 14 supporting an upright channel member 15, and a pair of spaced apart support plates 16 and 17 (FIG. 2) which extend upwardly from base 14 and are joined at their upper ends by cross brace members 18. The plates 16 and 17 support an assembly for a chuck which holds the upper container part 10.

Mounted on a cylinder mount plate 19 secured to the base plate 14 are a pair of double-acting, pneumatic cylinders or motors 20 having piston rods 21 fixed to the depending sleeve 22 of a lower platen 23. The platen 23 forms part of a vertically moving part-carrying assembly generally designated 24 which carries the lower part 11 and is movable from a removed lower position vertically upwardly into engagement with the upper part-carrying assembly generally designated 25 which carries the part 10. As FIG. 1 indicates, the platen 23 has openings 23a which slideably accommodate fixed guide rods 26 provided in upright position on supports 27 and 28 which connect the plates 16 and 17. In addition, a bearing sleeve 29 is provided within sleeve 22 and receives a fixed guide post 30, mounted on a cross brace 32 connecting the plates 16 and 17, so that at all times the platen 23 moves in true vertical alignment.

Mounted on the platen 23 on rubber blocks 33 is a chuck support plate 34 which is secured to the platen 23 by bolts 35 having lower ball ends 36 received in sockets 37 provided in the platen 23. In view of the manner in which plate 34 is supported, it will be clear that it will be capable of some lateral shifting movement relative to the platen 23 as permitted by the resilient blocks 33. Fixed to the plate 34 is a vacuum chuck 38 having a part-receiving opening 39 which is shaped to the configuration of the part 11. The vacuum chuck 38 has vacuum ports 39a leading to a manifold opening 40 which may be connected to a suitable source of suction, such as a conventional vacuum pump, through a line 41 having a solenoid operated valve 42 (FIGS. 1 and 5) therein which is operable to communicate the manifold chamber 40 with the suction pump in one position, and to vent the chamber 40 to atmosphere in another.

The upper part-holding assembly 25 includes an identical vacuum chuck 43 having a part-receiving opening 44 of the configuration of part 10 connected with a manifold chamber 45 by vacuum ports 46. A similar line 47 connects the manifold chamber 45 with the suction pump mentioned through a valve 48 which similarly connects chamber 45 either with the suction pump or with the atmosphere. The vacuum chuck 43 is fixed to and depends from a chuck supporting plate 49 which is mounted on elongate rubber blocks 50 by means of bolts 51. It will be observed that the blocks 50 are of greater length than the blocks 33 and that the blocks 50 depend from a support plate 52 and are secured to it by bolts 53. Similar bolts 53 connect the blocks 50 with the plate 49. The plate 52 is secured to a top plate 53a joining the vertical support plates 16 and 17 by a bearing housing assembly generally designated 54 which, as shown, supports a shaft 55 for rotation in upper and lower roller bearing assemblies 56 and 57. Ring members 58 and 59 provided in the bearing assembly housing 54 restrict axial movement of the shaft 55 without in any way hampering its rotation.

Figure 3:
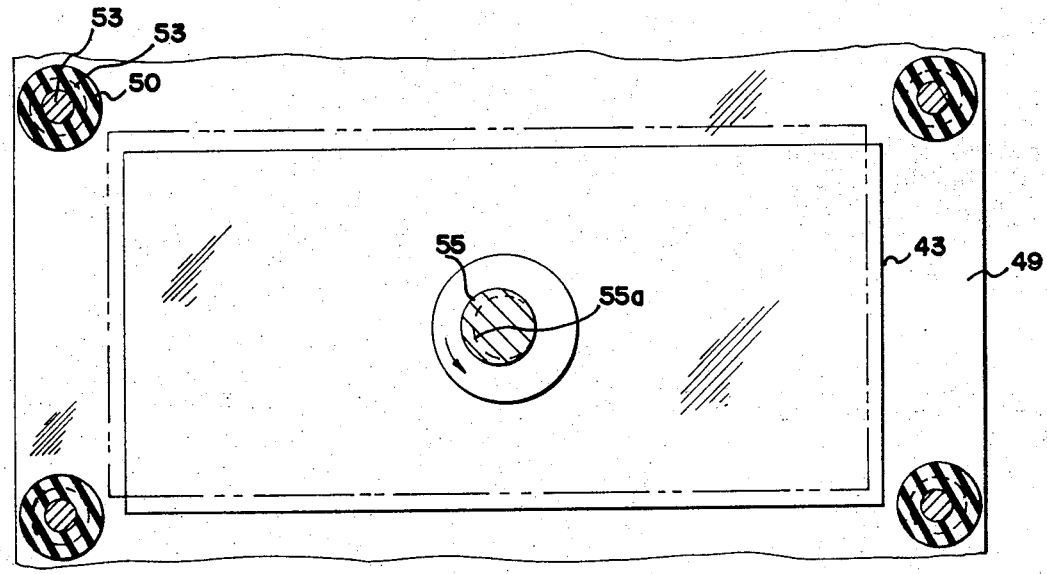
FIG. 3 is a sectional top plan view on a still more enlarged scale, taken on the line 3—3 of FIG. 1.

To provide a circular oscillating motion to the plate 49 and the vacuum chuck 43 and part 10 carried thereby, the shaft 55 includes an axially projecting eccentric portion 55a received within a roller bearing assembly 60 provided in a block 61 fixed to plate 49. Thus, when shaft 55 is rotated in a manner to be described, the part 10 is oscillated with respect to the part 11, and the flanges 10a and 11a are friction welded together when sufficient frictional energy is developed to heat the flanges 10a and 11a to the welding temperature of the material. Generally speaking, the eccentricity provided by the shaft part 55a will provide a limited throw, i.e., on the order of 1/32 to 1/8 of an inch. The range set forth is mentioned only by way of illustration and it is expected that the range could be increased with larger size flanges or decreased with smaller size flanges. In FIG. 3 the oscillating path taken by the flange 10 is indicated in the lower left-hand portion of the view, wherein the corner of the flange is shown moving through a circular path of movement. The part 11 is held in the vacuum chuck 38 in a manner to resist oscillation with the part 10 until a weld is achieved whence the resistance is overcome. The amount of resistance offered must be carefully selected for the material and area of engaged surfaces 10a and 11a.

In order to insure that further oscillation will not break the friction weld achieved, once it is effected, the drive for shaft 55 is one which can be disconnected or disabled when the weld is achieved. On its upper end, shaft 55 is provided with a pulley 62 as shown and a drive belt 63 is so mounted as to be movable into and out of driving engagement with the pulley 62. As FIGS. 1 and 2 particularly indicate, the endless drive belt 63 is trained around a pulley 64 at one end and a pulley 65 at the other. The pulley 64 is supported on a pivot arm 66 which is pivotally mounted, as with a pin 66a extending between clevis arms 67 which project from a support plate 68. The pulley 64 is supported by a bolt member 69 dependent from the arm 66 which carries a roller bearing member 70. A double-acting, solenoid operated, pneumatic cylinder or motor 71 mounted on a frame support arm 72 has its piston rod 73 pivotally connected as at 74 to a lug 75 on the support arm 66 and is operable to move the arm 66, pulley 64, and belt 63 thereby, forwardly and rearwardly from a position in which belt 63 is out of engagement with the pulley 62 to a position in which it is in driving engagement therewith. Provided to drive the pulley 65 is a combined motor and speed reduction unit 76 of conventional character which has an output shaft 77 mounting the pulley 65.

Figure 5:
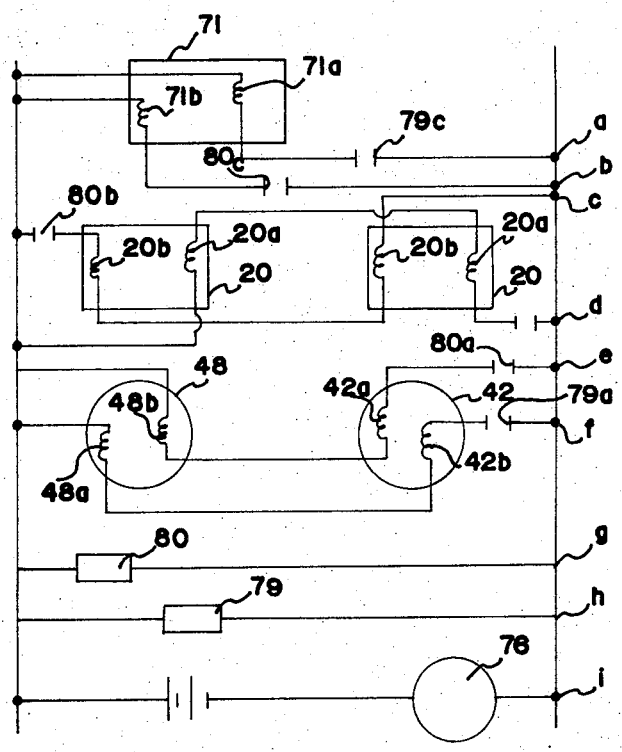
FIG. 5 is a schematically depicted electrical control circuit.

In FIG. 5 a typical electrical control circuit for the machine is shown but it is to be understood that other control circuits of various types may be employed. Mounted on a frame support plate 78 is a normally open limit switch 79 which is adapted to be closed when the plate 34 moves laterally and signifies that the friction weld has been effected. Because the blocks 33 and 50 are of different length while approximately of the same durometer rating, the plate 34 has a greater resistance to oscillation than the plate 49, and the plate 34 will only be moved when the weld has been completed and oscillating movement is transmitted through parts 10 and 11. As FIG. 5 indicates the limit switch 79 has normally open contacts 79a, 79b and 79c. The contacts 79c are in a circuit line a in series with the retract solenoid 71a of the cylinder 71. Mounted on one of the bases 28 is a normally open, time delay limit switch 80 which has normally open contacts 80a, 80b and 80c that closed when the platen 23 is lowered to actuate the switch 80. The contacts 80c are in a circuit line b in series with the advance solenoid 71b of cylinder 71.

Mounted in circuit line c in series with the advance solenoids 20b of cylinders 20 are the contacts 80b, and circuit line d connects the contacts 79b with the retract solenoids 20a of the cylinders 20. The double-acting valves 42 and 48 have solenoids 42a and 48a in a circuit line e in series with the contacts 80a and have solenoids 48b and 42b in a circuit line f in series with the contacts 79a. The motor 76 is in a circuit line g.

Figure 1:
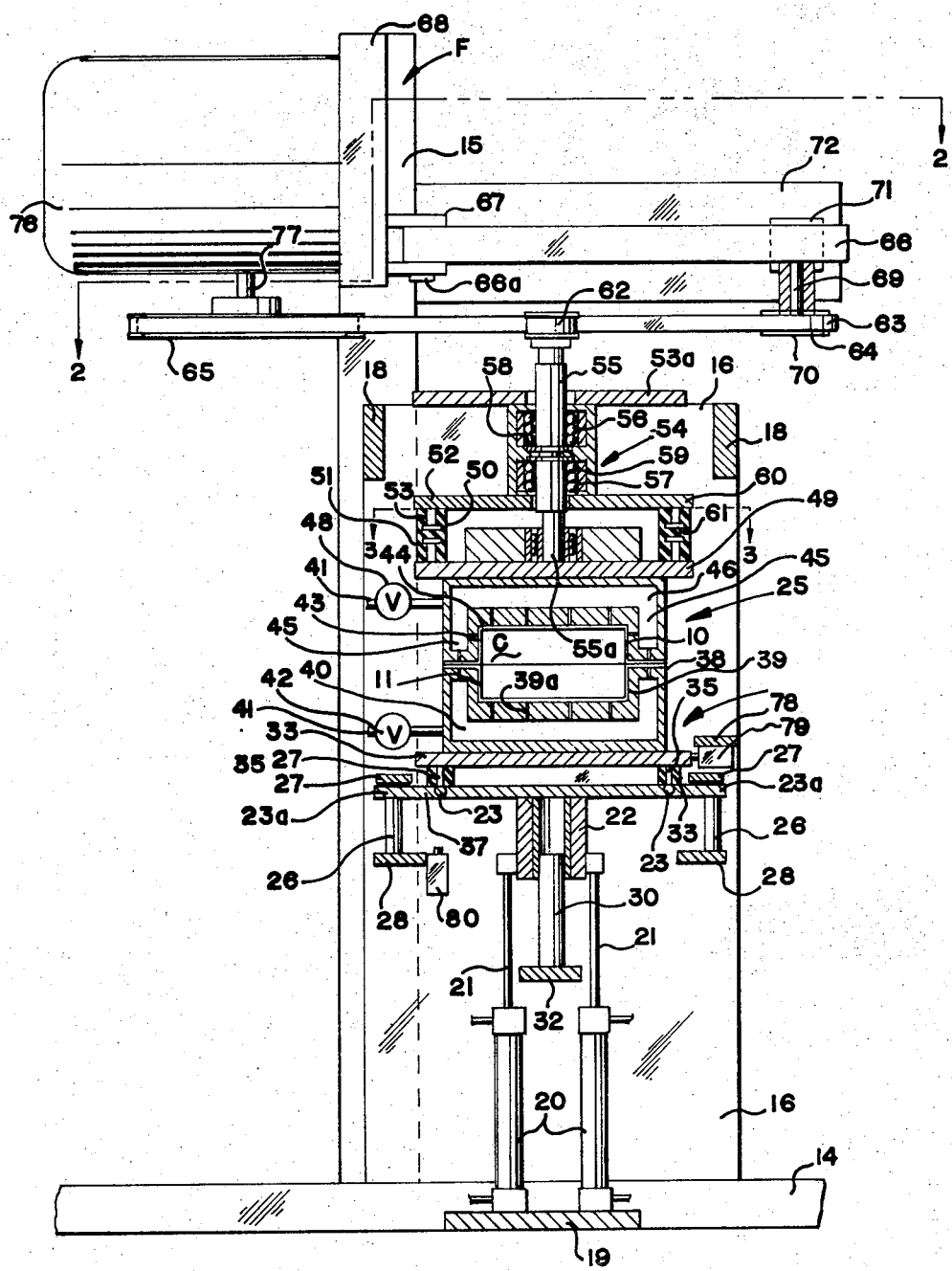
FIG. 1 is a sectional, elevational front view showing the parts to be joined moved to an engaging position for friction welding.
Figure 2:
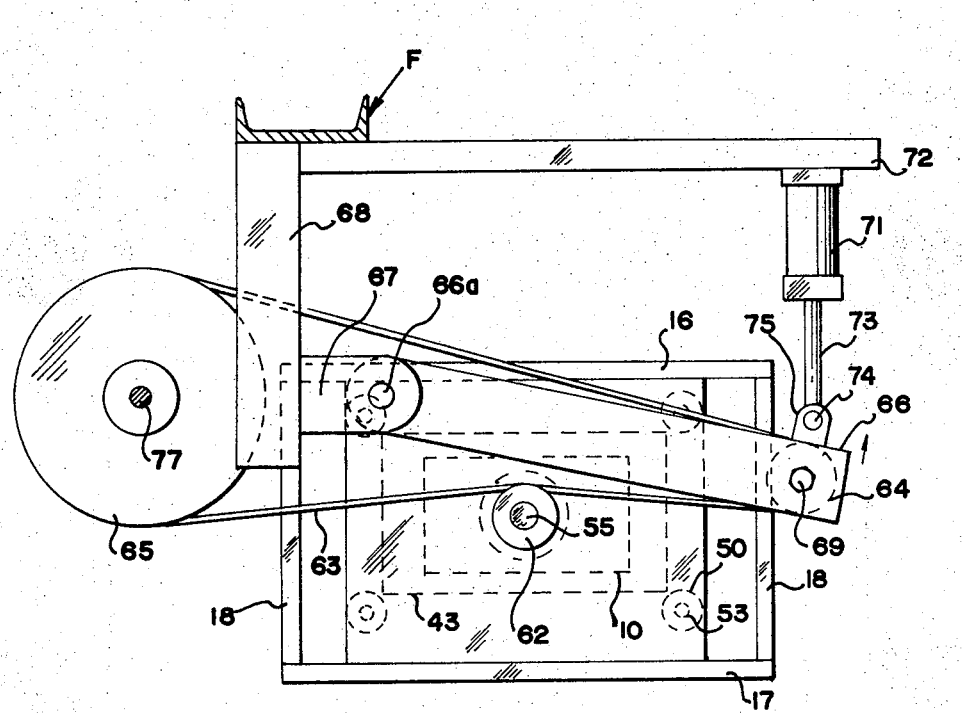
FIG. 2 is a slightly enlarged to plan view taken on the line 2—2 of FIG. 1.

In operation and with the apparatus in the drive position in which it is shown in FIGS. 1–3, switch 79 is first made by the plate 34 after a friction weld is achieved via continuous circular oscillating movement of the part flange 10a with respect to the part flange 11a. When the plate 34, in moving with the plate 49 after the weld is achieved, engages switch 79, contacts 79a–79c are immediately closed. The piston rod 73 is immediately retracted by the cylinder 71, with energization of retract solenoid 71a and withdraws drive belt 63 sharply from the pulley 62. At the same time, valves 42 and 48 are moved, with energization of solenoids 42b and 48b, to communicate the manifold chambers 40 and 45 with atmosphere, so that the parts 10 and 11 are no longer vacuum held by the chucks 38 and 43. Also, the piston rods 21 of cylinders 20 are retracted, when solenoids 20a are energized, to lower the part-holding assembly 24 to a position in which the welded together parts can be unloaded. When the plate 23 reaches the bottom of its downward travel, it makes the limit switch 80, which, as noted, is a time delay switch providing sufficient time for the operator to unload the welded part and reload new, individual parts 10 and 11 before contacts 80a–80c are closed. After this time delay, however, the solenoids 42a and 48a are energized to operate the valves 42 and 48 to recommunicate the manifolds 40 and 45 with a suction source. Simultaneously, the solenoids 20b of cylinders 20 are energized to advance the piston rods 21 and move the part-holding assembly 24 upwardly toward the part-holding assembly 25. Also, the solenoid 71b is energized to advance the piston rod 73 of piston 71 and swing the arm 65 forwardly once again so that, by the time the new parts 10 and 11 are in engagement, the belt 63 is once again in driving engagement with the pulley 62. In this manner the machine may be cycled continuously. While a manual loading and unloading operation has been described, automatic loading and unloading may be accomplished in other machines and it is to be understood that the method and apparatus described will not in any way be changed in such machines. Further, a cam timer of the well-known Gemco variety may be used to actuate each of the contacts 79a–79c and 80a–80c in place of switches 79 and 80, if desired.

The switch 80 is utilized when heavier parts are being friction welded. When container or like parts having relatively thin and flexible side walls are being welded there is enough flexibility in the bottom part so that the bottom part need not move bodily once the weld is achieved. The side walls will simply flex without in any way rupturing or affecting the weld.

It is to be understood that the drawings and descriptive matter are in all cases to be interpreted as merely illustrative of the principles of the invention rather than as limiting the same in any way, since it is contemplated that various changes may be made in the various elements to achieve like results with out departing from the spirit of the invention or the scope of the appended claims.

We claim:

1. Apparatus for cyclically friction welding thermoplastic synthetic plastic parts, comprising: a holder member for one part; a second opposite holder member for a second part to be friction welded to the first part; means for relatively moving at least one of said holder members from a removed position toward the other holder member to engage the respective part surfaces to be friction welded; drive means for oscillating one of said holder members to bodily move one part held thereby relative to the other part in a path of travel parallel to the surfaces to be welded to friction weld said parts together; transversely unrestrained and transversely yieldable, movement resisting means operable throughout the entire cycle to yieldably mount the other holder member and resist a predetermined transverse force applied to transversely move it when the parts are being welded to prevent said other holder member from transversely moving with the oscillating holder member when the parts are engaged until a weld is achieved, the resistance of said yieldable means to movement of said other holder member being overcome only after the weld is achieved, to then permit said other holder member to automatically, transversely move with said one holder member.

2. The combination defined in claim 1 in which said oscillated part holder member has a bearing for receiving the eccentric portion of a drive shaft which extends generally perpendicularly to the engaged surfaces of said parts.

3. The combination defined in claim 2 in which sensing means in the path of said holder member for the other part indicates when the weld has been achieved and said other part is being oscillated by the one of said parts being oscillated.

4. The combination defined in claim 3 in which said sensing means is connected to disable said drive shaft when the weld has been achieved.

5. The combination defined in claim 4 in which said drive shaft has a pulley thereon and a drive belt is movable from a position remote from said pulley to a position in engagement therewith; and electrically controlled motor means for moving said drive belt and pulley, connected with said sensing means.

6. The combination defined in claim 3 in which electrically controlled motor means moves said one of said holder members toward and away from the other holder member, and said sensing means is connected to move said one holder member away from the other holder member when a weld has been achieved.

7. The combination defined in claim 3 in which said holder members comprise vacuum chucks with electrically controlled valve means selectively communicating the chucks with a vacuum source and vacuum release, and said sensing means is connected to release the vacuum when a weld has been achieved.

8. The combination defined in claim 1 in which each point on said oscillated part is moved in a generally circular path having a very small radius relative to the part area.

9. Apparatus as set forth in claim 1 wherein said transversely yieldable means comprises resilient mounting means solely resisting movement throughout the cycle.

10. The apparatus of claim 1 including means responsive to transverse movement of said other holder member to axially move said part holding members to said remote positions.

11. The apparatus of claim 9 including means in the path of said other holder member for disabling said drive means to halt said oscillating movement of said one member.

References Cited

UNITED STATES PATENTS

| | | | |
|---|---|---|---|
| 3,002,871 | 10/1961 | Tramm et al. | 156—73 |
| 3,078,912 | 2/1963 | Hitzelberger | 156—73 |
| 3,385,741 | 5/1968 | Allen | 156—73 |
| 3,444,018 | 5/1969 | Hewitt | 156—73 |
| 3,316,135 | 4/1967 | Brown et al. | 156—580 |

FOREIGN PATENTS

| | | | |
|---|---|---|---|
| 863,166 | 3/1961 | Great Britain | 156—73 |
| 807,848 | 1/1949 | Germany | 156—73 |

OTHER REFERENCES

"Fabricating With Friction Heat," Robert N. Freres, Modern Plastics, November 1945.

BENJAMIN A. BORCHELT, Primary Examiner

J. V. DORAMUS, Assistant Examiner

U.S. Cl. X.R.

156—73